United States Patent
Fujitani et al.

[11] Patent Number: 5,158,391
[45] Date of Patent: Oct. 27, 1992

[54] SEALING STRUCTURE OF WATERPROOF CONNECTOR

[75] Inventors: Mitsuhiro Fujitani, Yokkaichi; Akira Nabeshima, Mie; Toshikazu Saba, Matsusaka, all of Japan

[73] Assignee: Sumitomo Wiring Systems, Ltd., Yokkaichi, Japan

[21] Appl. No.: 674,995

[22] Filed: Mar. 26, 1991

[30] Foreign Application Priority Data

Apr. 2, 1990 [JP] Japan .................. 2-35559[U]

[51] Int. Cl.⁵ .............................................. F16B 2/00
[52] U.S. Cl. .................................. 403/288; 403/361; 439/271; 277/207 R
[58] Field of Search .............. 403/288, 361; 439/271, 439/272, 273, 278, 282; 277/9.5, 136, 166, 189, 207 A, 207 R, 210, 209; 174/65 G, 152 G, 153 G, 52.3

[56] References Cited

U.S. PATENT DOCUMENTS

| | | | |
|---|---|---|---|
| 4,611,872 | 9/1986 | Ito et al. | 439/277 |
| 4,621,883 | 11/1986 | Noguchi | 439/271 X |
| 4,820,181 | 4/1989 | Kuzuno et al. | 439/272 |
| 4,874,325 | 10/1989 | Bensing et al. | 439/272 |
| 4,917,620 | 4/1990 | Samejima et al. | 439/272 |

Primary Examiner—Randolph A. Reese
Assistant Examiner—Harry C. Kim
Attorney, Agent, or Firm—Sughrue, Mion, Zinn, Macpeak & Seas

[57] ABSTRACT

A sealing structure of a waterproof connector in which a connector housing having a connector housing body assembled with an inner member is coupled with a mating connector housing through a seal ring having a sealing band, comprising: a pair of engageable members each having an L-shaped cross section, which project forwardly from a front end of a side wall of the seal ring such that distal end portions of the engageable members bend in opposite inward directions of the seal ring, respectively; the engageable members each having a front end face such that the front end face is brought into contact with the bottom of a hollow; a contact piece which is provided at a predetermined position of the inner member so as to be brought into pressing contact with the engageable members; and the engageable members being gripped between the bottom of the hollow and the contact piece such that the seal ring is secured.

3 Claims, 3 Drawing Sheets

SEALING STRUCTURE OF WATERPROOF CONNECTOR

BACKGROUND OF THE INVENTION

The present invention relates to a sealing structure of a waterproof connector in which a connector housing having a connector housing body assembled with an inner member by inserting the inner member into the connector housing body is coupled with a mating connector housing through a seal ring in waterproof state.

FIG. 1 shows a known waterproof connector in which a connector housing 1 having a connector housing body 3 assembled with an inner member 4 is coupled with a mating connector housing 2 through a seal ring 7. In FIG. 1, the inner member 4 is inserted into a hollow 5 of the connector housing body 3 so as to be assembled with the connector housing body 3 and thus, the connector housing 1 is obtained. Meanwhile, the seal ring 7 has a plurality of rows of sealing bands 6 and is fitted into the hollow 5 such that the sealing bands 6 come into close contact with an inner periphery 11 of the hollow 5. Furthermore, the mating connector housing 2 is closely fitted into a gap formed between an inner periphery of the seal ring 7 and an outer periphery of the inner member 4 so as to be coupled with the connector housing 1 in waterproof state.

As shown in FIG. 2, the seal ring 7 has a substantially rectangular shape and a pair of fixing lugs 13 extend longitudinally outwardly from opposite ends of a top portion of the seal ring 7, respectively. Meanwhile, in the vicinity of an inlet of the hollow 5, a pair of slots 14 are formed on a side wall of the connector housing 1 such that the fixing lugs 13 are, respectively, engaged with the slots 14. The seal ring 7 is secured to the connector housing 1 through engagement of the fixing lugs 13 with the slots 14 so as not to be readily removed from the connector housing 1 when the connector housings 1 and 2 are coupled with and detached from each other.

In the known waterproof connector of the above described arrangement, the fixing lugs 13 are required to be provided at the top portion of the seal ring 7, namely in the vicinity of the inlet of the hollow 5 in order to obtain the waterproof function of the seal ring 7. Thus, the sealing bands 6 disposed below the fixing lugs 13 are not engaged with the hollow 5 and a peripheral wall of the mating connector housing 2 so as to be set free relative thereto.

Therefore, in the case where the connector housings 1 and 2 are coupled with and detached from each other, a large frictional force is produced between an inner face of the sealing bands 6 and a side wall of the connector housing 2. Especially, when the connector housing 2 is detached from the connector housing 1, an external force P is applied to an inner side portion of the sealing bands 6 due to the frictional force caused by detachment of the connector housing 2 from the connector housing 1. As the connector housing 2 is gradually drawn from the connector housing 1, the sealing bands 6 are set free on the inner face and therefore, is readily subjected to elastic deformation so as to be oriented improperly. Thus, when the connector housings 1 and 2 are coupled with and detached from each other repeatedly, an intermediate row of the sealing bands 6 is subjected to torsional deformation. As a result, such problems may arise that the waterproof function of the seal ring 7 deteriorates and the seal ring 7 is accidentally removed from the connector housing 1.

SUMMARY OF THE INVENTION

Accordingly, an essential object of the present invention is to provide a sealing structure of a waterproof connector which eliminates the inconveniences inherent in conventional waterproof connectors.

In order to accomplish this object of the present invention, there is provided a sealing structure of a waterproof connector in which an inner member is fitted into a hollow of a connector housing body so as to be assembled with said connector housing body such that a connector housing is constituted, in which a seal ring having a sealing band is fitted into the hollow and in which a mating connector housing is fitted into a gap formed between an inner periphery of said sealing band and an outer periphery of said inner member so as to be coupled with said connector housing, according to the present invention, the improvement comprising: a pair of engageable members having L-shaped cross sections, which project forwardly from a front end of a side wall of said seal ring so as to confront each other such that distal end portions of said engageable members bend in opposite inward directions of said seal ring, respectively; said engageable members each having a front end face such that said front end face is brought into contact with a bottom of the hollow; a contact piece which is provided at a predetermined position of said inner member so as to be brought into pressing contact with said engageable members; and said engageable members being gripped between said bottom of the hollow and said contact piece such that said seal ring is secured.

In the sealing structure of the present invention, the engageable pieces having L-shaped cross sections are provided at the front end of the seal ring having the sealing band and are gripped between the bottom of the hollow and the contact piece of the inner member. Therefore, the front end portion of the seal ring fitted into the hollow is mechanically secured. Thus, even if an external force for deforming the seal ring is applied to the seal ring due to a large frictional force between the mating connector housing and the seal ring when the mating housing connector is detached from the connector housing, the seal ring is resistant against the external force so as not to be deformed. Accordingly, even if the connector housing and the mating connector housing are coupled with and detached from each other repeatedly, the seal ring is free from plastic deformation or improper orientation due to undesirable torsion and thus, excellent sealing performance of the seal ring is obtained. Furthermore, since the seal ring is fixed quite securely, the seal ring can be completely prevented from being accidentally removed from the connector housing.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
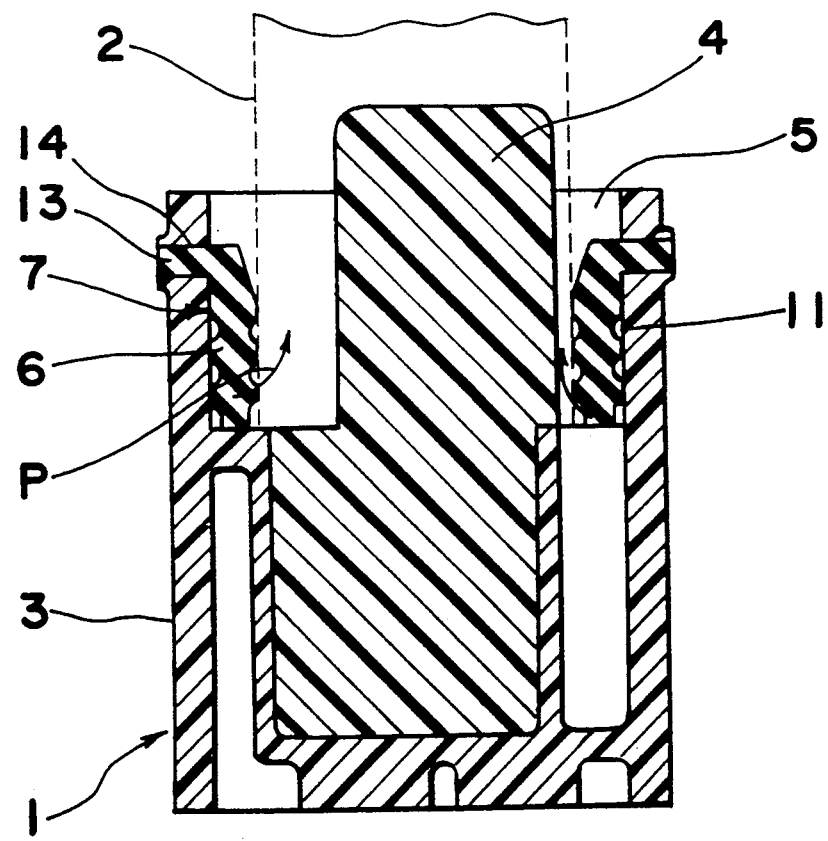
FIG. 1 is a sectional view of a prior art waterproof connector (already referred to)
Figure 2:
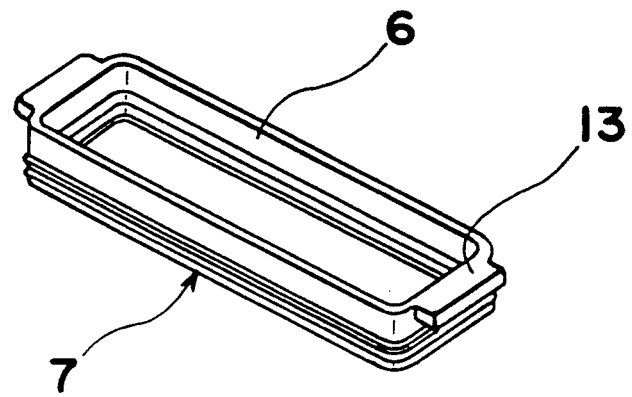
FIG. 2 is a perspective view of a seal ring employed in the prior art waterproof connector of FIG. 1 (already referred to)
Figure 3:
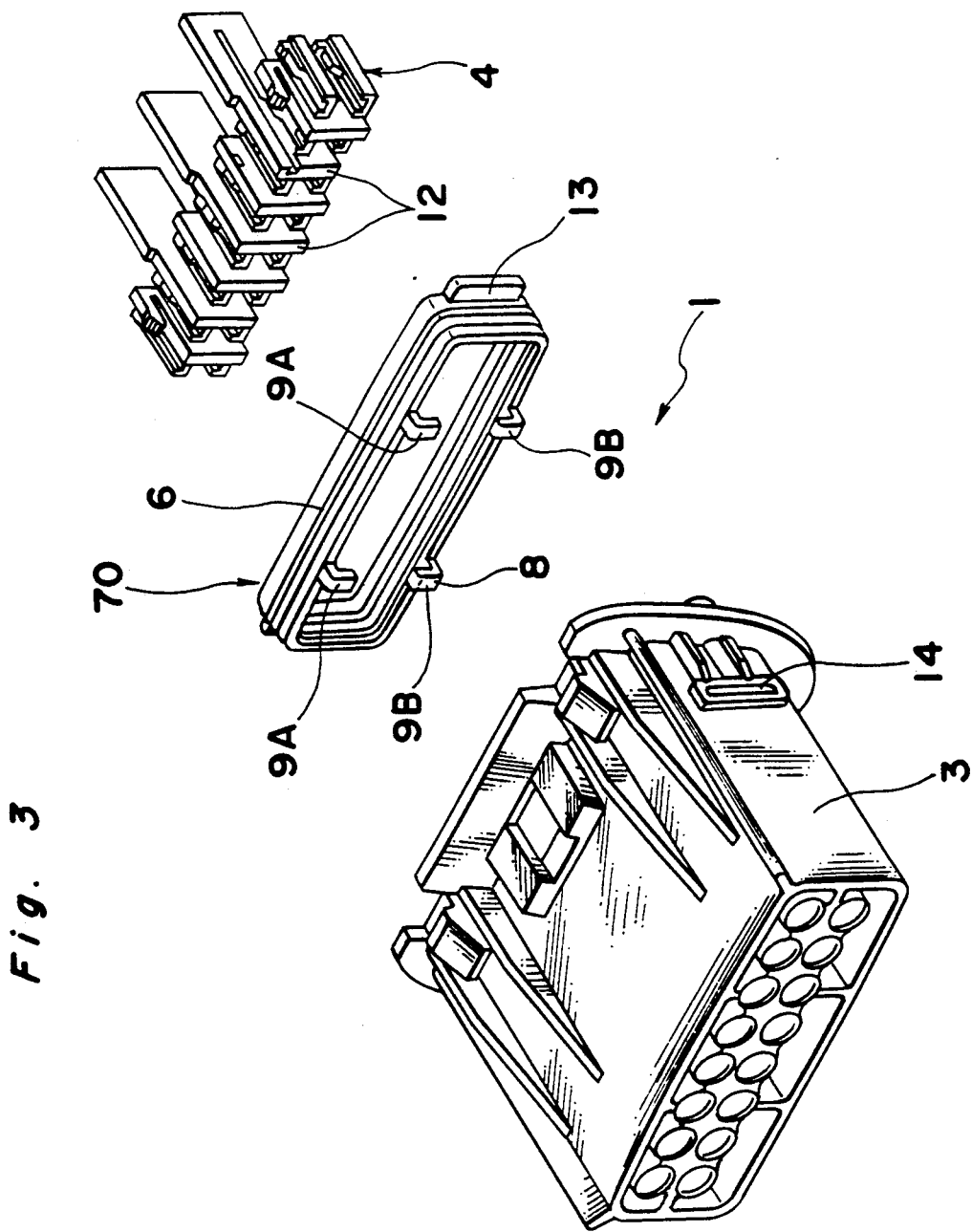
FIG. 3 is an exploded perspective view of a connector housing employed in a waterproof connector according to one embodiment of the present invention.

Referring now to the drawings, there is shown in FIG. 3, a connector housing 1 employed in a waterproof connector according to one embodiment of the present invention. The waterproof connector includes the connector housing 1 and a mating connector housing 2 which are coupled with each other in a waterproof state. The connector housing 1 includes a connector housing body 3 and an inner member 4. The inner member 4 is inserted into a hollow 5 of the connector housing body 3 so as to be assembled with the connector housing body 3 such that the connector housing 1 is obtained. Then, a seal ring 70 having a plurality of rows of sealing bands 6 is fitted into the hollow 5 such that the sealing bands 6 come into close contact with an inner periphery 11 of the hollow 5. A head portion of the mating connector housing 2 is closely fitted into a gap formed between an inner periphery of the sealing bands 6 and an outer periphery of the inner member 4 so as to be coupled with the connector housing 1 in a waterproof state.

Figure 4:
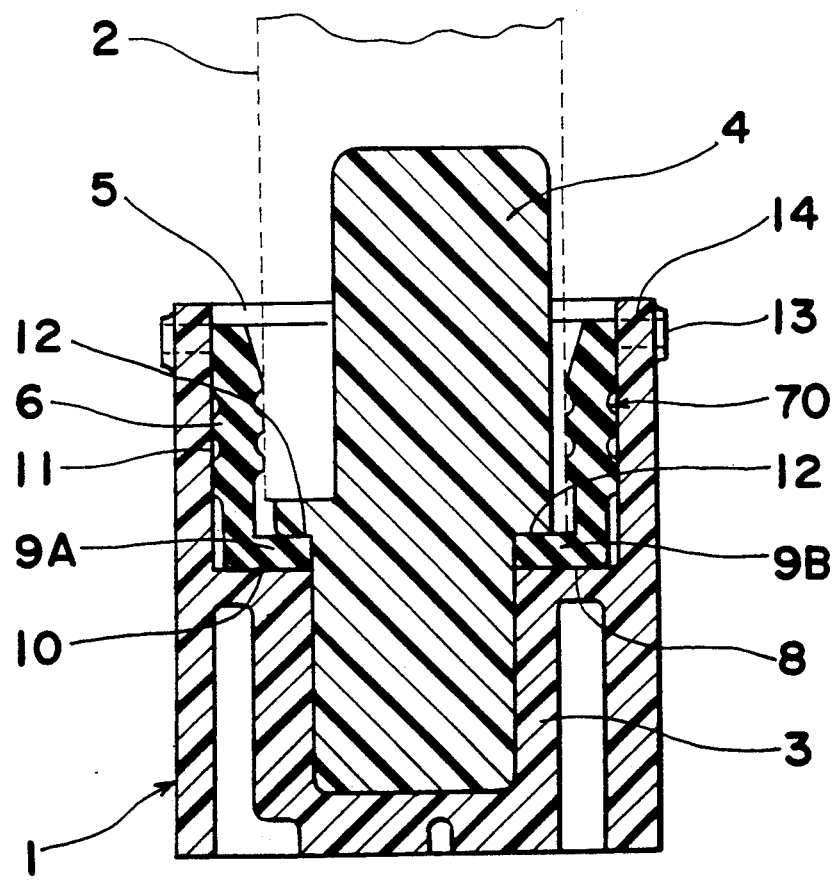
FIG. 4 is a sectional view of the waterproof connector of FIG. 3.

The seal ring 70 has a substantially rectangular shape and is provided with a pair of engageable pieces 9A and a pair of engageable pieces 9B. Each of the engageable pieces 9A and 9B has an L-shaped cross section. The engageable pieces 9A project forwardly from arbitrary positions on a front end of an upper side wall of the seal ring 70 such that distal end portions of the enagageable pieces 9A bend downwardly. It is to be noted that such positional indications as "upper" and "lower" relate to the illustration in FIG. 3 and such directional indications as "front" and "rear" represent leftward and rightward directions in FIG. 3, respectively, hereinbelow. Likewise, the engageable pieces 9B project forwardly from a front end of a lower side wall of the seal ring 70 and distal end portions of the engageable pieces 9B bend upwardly so as to confront those of the enagageable pieces 9A, respectively. A front end face 8 of each of the engageable pieces 9A and 9B is brought into contact with a bottom 10 of the hollow 5 as shown in FIG. 4.

On the other hand, a plurality of contact pieces 12 are provided on a front end of the inner member 4 so as to define a front end face of the inner member 4. When the inner member 4 has been inserted into the hollow 5 of the connector housing body 3 in a normal orientation, two of the contact pieces 12 are brought into contact with rear faces of the engageable pieces 9A and 9B so as to depress the enagageable pieces 9A and 9B forwardly.

The connector housing 1 is assembled as follows. As shown in FIG. 4, the seal ring 70 is initially fitted into the hollow 5 of the connector housing body 3 such that the front end face 8 of each of the engageable pieces 9A and 9B is brought into contact with the bottom 10 of the hollow 5. Then, the inner member 4 is inserted into the hollow 5 so as to be assembled with the connector housing body 3 and the engageable pieces 9A and 9B of the seal ring 70 are gripped between the corresponding contact pieces 12 and the bottom 10 of the hollow 5 such that the seal ring 70 is secured. Subsequently the mating connector housing 2 is fitted into the gap formed between the seal ring 70 and the inner member 4 such that an outer periphery of the mating connector housing 2 is brought into pressing contact with the inner periphery of the seal ring 70, whereby the connector housings 1 and 2 are coupled with each other.

Meanwhile, in this embodiment, a pair of fixing lugs 13 are provided on a rear end portion of the seal ring 70 in the same manner as the prior art seal ring referred to earlier and are, respectively, engaged with a pair of slots 14 of the connector housing body 3 so as to stabilize orientation of the rear end portion of the seal ring 70, i.e. a portion of the seal ring 70 adjacent to an inlet of the hollow 5.

Figure 5:
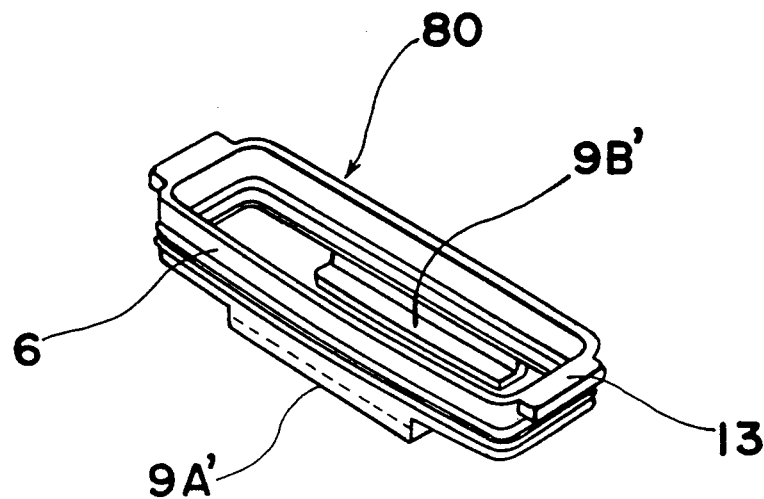
FIG. 5 is a perspective view of a seal ring employed in a waterproof connector according to another embodiment of the present invention.

FIG. 5 shows a seal ring 80 employed in a waterproof connector according to another embodiment of the present invention. The seal ring 80 is provided with elongated engageable pieces 9A' and 9B' each having an L-shaped cross section. The elongated engageable pieces 9A' and 9B' are, respectively, provided on a front end of opposite side walls of the seal ring 80 and extend along the side walls over a considerable portion of a length of the side walls. Thus, the engageable pieces 9A' and 9B' are gripped between the contact pieces 12 of the inner member 4 and the bottom 10 of the hollow 5 such that the seal ring 80 is secured more positively than the seal ring 70.

Accordingly, in the above described embodiments, since the front end portion of the seal ring is mechanically fixed, the seal ring is secured positively.

Meanwhile, in the present invention, the number and interval of the engageable pieces are not restricted to those of the above described embodiments and thus, can be changed variously in accordance with shape and construction of the connector housing.

As is clear from the foregoing description, in the sealing structure of the waterproof connector of the present invention, deformation of the seal ring and accidental removal of the seal ring from the connector housing are prevented, so that excellent sealing performance of the seal ring can be obtained stably and thus, performances of the waterproof connector are improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a sealing structure of a waterproof connector in which an inner member is fitted into a hollow of a connector housing body so as to be assembled with said connector housing body such that a connector housing is constituted, in which a seal ring having a sealing band is fitted into the hollow and in which a mating connector housing is fitted into a gap formed between an inner periphery of said sealing band and an outer periphery of said inner member so as to be coupled with said connector housing, the improvement comprising:

a pair of engageable members each having an L-shaped cross section and which project forwardly from a front end of a side wall of said seal ring so as to confront each other such that distal end portions of said engageable members bend in opposite inward directions of said seal ring, respectively, said distal end portions of said engageable members extending inwardly beyond said inner periphery of said sealing band so as to define rear end faces;

said engageable members each having a front end face such that said front end face is brought into contact with a bottom of the hollow;

a contact piece which is provided at a front end face of said inner member so as to be brought into pressing contact with said rear end faces of said engageable members; and said engageable members being gripped between said bottom of the hollow and said contact piece such that said seal ring is secured.

2. A sealing structure as claimed in claim 1, wherein one of said engageable members comprises a pair of first engageable pieces spaced apart by a distance from each other along said side wall of said seal ring, while the other of said engageable members comprises a pair of second engageable pieces spaces apart by said distance from each other along said side wall of said seal ring.

3. A sealing structure as claimed in claim 1, wherein each of said engageable members comprises an elongated engageable piece extending over a distance along said side wall of said seal ring.

* * * * *